United States Patent [19]

Hobbick et al.

[11] 4,146,086
[45] Mar. 27, 1979

[54] FURNACE BLOWER SPEED CONTROL

[75] Inventors: Art Hobbick, Speedway; Gary W. Ballard, Brownsburg; Robert M. Mamot, Plainfield, all of Ind.

[73] Assignee: Carrier Corporation, Syracuse, N.Y.

[21] Appl. No.: 846,736

[22] Filed: Oct. 31, 1977

[51] Int. Cl.[2] .............................................. F25B 29/00
[52] U.S. Cl. .................................... 165/25; 62/180; 165/27; 236/1 C
[58] Field of Search ............... 165/27, 26, 25; 62/180; 236/1 C

[56] References Cited

U.S. PATENT DOCUMENTS

| | | | |
|---|---|---|---|
| 3,766,973 | 10/1973 | De Grella, Jr. et al. | 165/26 |
| 3,785,433 | 1/1974 | Ballard | 165/27 |

Primary Examiner—William E. Wayner
Attorney, Agent, or Firm—J. Raymond Curtin; Robert P. Hayter

[57] ABSTRACT

A combination thermostat and blower speed control for use with an air conditioner for both heating and cooling air which is circulated through an enclosure by a multi-speed blower. The control has a system switch for selecting either a heating or cooling mode of operation and a blower speed switch for selecting either automatic blower operation or continuous low speed or high speed operation. The combination thermostat and blower speed control has a built-in override such that when the thermostat senses a cooling need and the control is in the cooling mode of operation the blower will operate at high speed notwithstanding the selection of the blower speed at the blower speed switch.

6 Claims, 2 Drawing Figures

FURNACE BLOWER SPEED CONTROL

BACKGROUND OF THE INVENTION

1. Field of the Invention

The present invention relates to controls for air conditioners. More specifically the present invention relates to a combination thermostat and blower speed control for use with an air conditioner which has both heating and cooling modes of operation, typically a hot air furnace in combination with a refrigeration unit.

2. Prior Art

Combination thermostat and blower speed controls have been used to provide safe and efficient operation of a hot air furnace having in combination therewith a refrigeration unit. Typically the thermostat section of the control senses a cooling need or heating need within the enclosure to be conditioned. A blower speed switch has been provided as part of the control wherein the blower speed may be selected to operate either continuously or on an automatic basis when conditioning is required.

Typical examples of combination thermostat and blower speed control circuits include U.S. Pat. Nos. 3,554,003, 3,587,558 and 3,664,414; all issued to the assignee hereof. These patents all include a system switch connected to the thermostat for selecting the appropriate mode of operation and a blower speed switch for selecting either continuous single speed blower operation or automatic blower operation when conditioning is required.

None of the cited art discloses the use of a multi-speed blower switch electrically connected to a system switch, such that upon cooling being required, the blower speed switch will be overridden so that the blower will be operated at high speed (cooling speed) notwithstanding the selection of blower speed at the blower speed switch. The advantages of this control method include the availability of continuous low speed operation of the blower for circulating air throughout the enclosure when the thermostat is set in the cooling mode of operation but the cooling system is idle. When the unit is providing cooling the blower will then be operated at high speed. After the cooling is discontinued the control will allow the blower to return to continuous circulation at low speed without subsequent control changes. All of this regulation of operation can be accomplished from the thermostat remote from the furnace.

SUMMARY OF THE INVENTION

It is an object of the invention to operate a safe efficient control circuit for a combination heating mode and cooling mode air conditioner.

It is another object of the present invention to have remote from the furnace a combination thermostat and blower speed control for regulation of the furnace operation, refrigeration unit operation and for speed control.

A still further object of the present invention is to provide an economical and reliable control circuit for use with an air conditioner wherein quiet operation may be had in the cooling mode of operation by providing for low speed blower operation between periods of cooling.

It is another object of the present invention to provide a control system wherein upon a cooling need being sensed blower speed operation may be altered to comply with that cooling need without discontinuing the previously set blower speed.

Other objects will be apparent from the description to follow and from the appended claims.

The preceding objects are achieved according to the preferred embodiment of the invention by the provision of a thermostat connected to a system switch. The system switch has three positions providing for the selection of heating mode of operation, cooling mode of operation and no operation. A blower speed switch is further provided also having three positions one each for automatic operation, low speed operation and high speed operation. The switches are electrically connected such that when the system switch is in the cooling mode of operation and a cooling need is sensed by the thermostat the blower speed will be operated at the high cooling speed notwithstanding that the blower speed switch may be set in either the automatic or low speed positions.

DESCRIPTION OF THE PREFERRED EMBODIMENT

The embodiment of the invention described below is adapted for use in a residential furnace application having a refrigeration unit connected thereto, although it is to be understood that the invention finds like applicability in other forms of air conditioning equipment. The control circuits described below will have equal import to circuits for use with other types of air conditioning equipment including commercial and industrial uses.

The typical hot air furnace has a heat exchanger fired by a burner, usually using natural gas or fuel oil as a source of energy, and a fuel regulator controlling the amount of fuel flow to the burner. The fuel is burned within the heat exchanger and exhaust gas within the heat exchanger is discharged into the atmosphere external of the enclosure to be heated. Room air to be heated is circulated by a blower over the outside of the heat exchanger thereby absorbing heat from the heat exchanger. This now heated air is circulated into the areas to be heated and simultaneously cold air may be withdrawn from those areas.

When cooling is required from the air conditioner the evaporator of the refrigeration unit which is mounted within the air circulation path from the furnace to the enclosure to be conditioned has refrigerant flowing therethrough, said refrigerant vaporizing from a liquid to a gas absorbing heat from the air in contact therewith. Air is circulated over the evaporator of the refrigeration unit to the area to be conditioned and heated air within the enclosure is withdrawn and recycled over the evaporator.

The thermostat of the system is used to determine when the air within the enclosure is at such a temperature that either heating or cooling is required. The blower speed of the blower is determined by the mode of operation preselected for the air conditioner. When heating is desired the blower is operated at low speed and when cooling is desired the blower is operated at high speed. By providing a blower speed switch the blower may be operated independently of the heating or cooling needs by selecting either the low or high speed operation of the blower. Of course automatic operation of the blower is dependent upon the heating mode of operation or the cooling mode of operation and may be had by selecting the automatic position of the blower speed switch.

Figure 1:
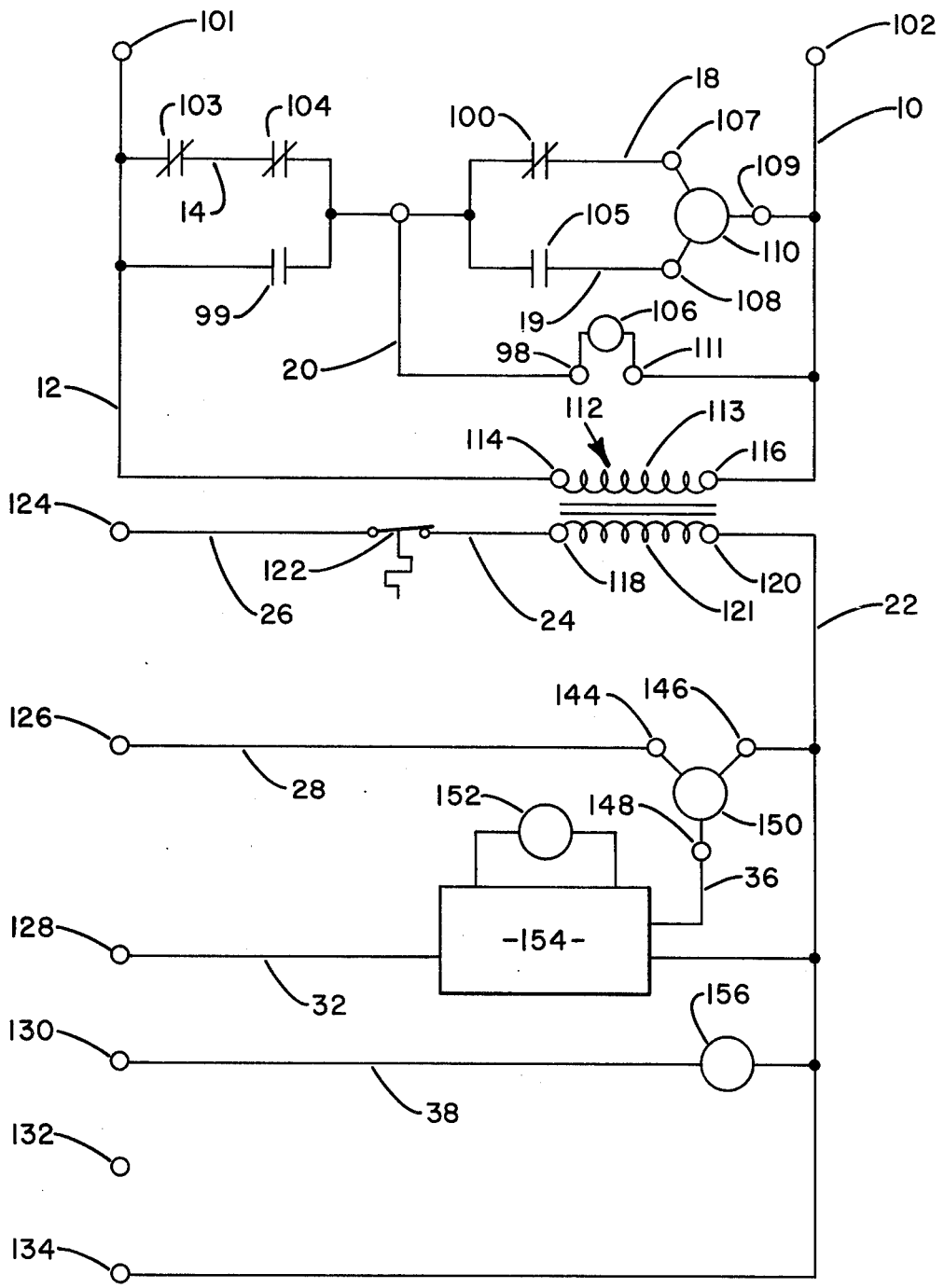
FIG. 1 is a schematic diagram of the wiring circuit of a hot air furnace adapted to be used in combination with an air conditioner.

Referring to the drawings FIG. 1 is a schematic diagram of the wiring of the typical hot air furnace. This wiring diagram is adapted to be used with a printed circuit board and the terminals are labeled as they would be in a printed circuit board so the various components may be quickly and easily connected to each other and the printed circuit board. As can be seen in FIG. 1 power is received by the furnace through terminals 101 and 102. Normally these terminals receive power from the electrical circuitry of the home or other area where the conditioning is being utilized. Wire 12 connects terminal 101 to terminal 114 primary winding 113 of transformer 112, to normally open cooling blower relay contacts 99, and to normally closed heating blower relay contacts 103. Wire 10 connects terminal 102 to terminal 116 of transformer 112, to terminal 111 of electronic air purifier 106 and to common terminal 109 of blower motor 110. Wire 14 connects normally closed heating blower relay contacts 103 with normally closed cooling blower relay contacts 104. Wire 20 connects terminal 98 of electronic air purifier 106 with cooling blower relay contacts 99, 104, 100 and 105. Wire 18 connects normally closed cooling blower relay contacts 100 with low speed motor terminal 107. Wire 19 connects normally open cooling blower relay contacts 105 with high speed blower motor terminal 108. Between terminals 114 and 116 is mounted primary winding 113 of transformer 112.

The secondary winding 121 of the transformer is mounted between terminals 118 and 120 of the control circuit portion of the wiring diagram, the control circuit portion being that portion of the circuit operating at the lesser voltage level generated from the secondary winding of the transformer. Connected to terminal 120 of the secondary winding of transformer 112 is wire 22 which is also connected to terminal 146 of gas regulator valve 150, to time delay relay circuit 154, to cooling blower relay 156 which controls cooling blower relay contacts 99, 100, 104 and 105 and to common terminal 134. Wire 24 connects secondary terminal 118 and over-temperature limit switch 122 and wire 26 connects the over-temperature limit switch to terminal 124. Wire 32 connects terminal 128 and time delay relay circuit 154. Wire 28 connects terminal 126 to terminal 144 of gas regulator valve 150. Blower relay 152 which controls normally closed heating blower relay contacts 103 is connected to the time delay relay circuit 154. Also connected to time delay relay circuit by wire 36 is gas regulator valve terminal 148. Terminal 130 is connected to cooling blower relay 156 by wire 38. Terminal 132 is provided for connection to the cooling unit contactor which is not shown.

Figure 2:
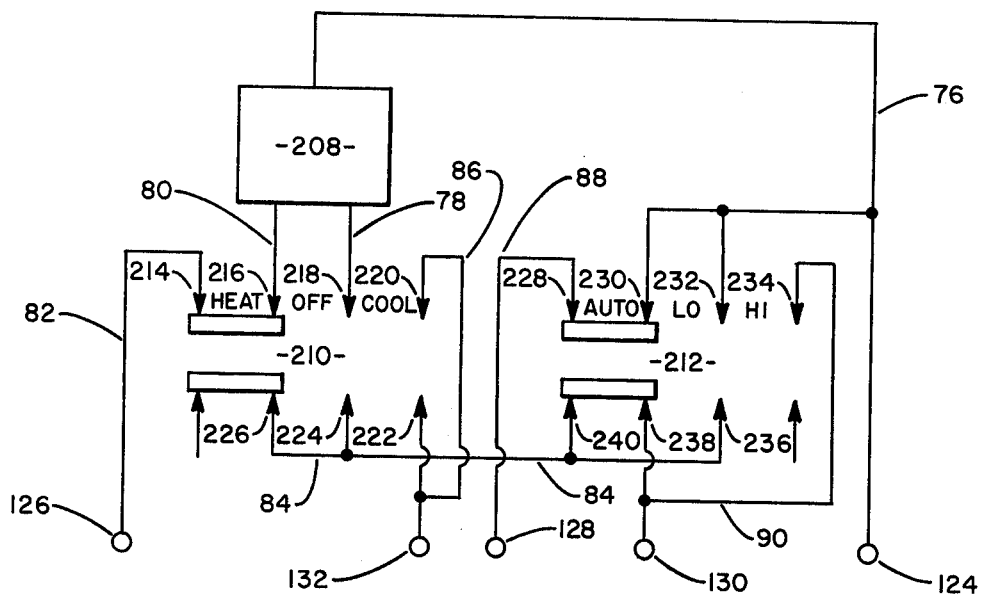
FIG. 2 is a schematic wiring diagram of the combination thermostat and blower speed control adapted to be used with the wiring circuit shown in FIG. 1.

Referring to FIG. 2 which is wiring diagram of the combination thermostat and blower speed control, it can be seen that wire 76 connects thermostat 208 to terminal 124 and to terminals 230 and 232 of the blower speed switch 212. Thermostat 208 is connected by wire 80 to terminal 216 of system switch 210 and by wire 78 to terminal 218 of the system switch 210. Wire 82 connects terminal 126 to terminal 214 of the system switch. Terminals 226 and 224 of the system switch are connected by wire 84 to terminals 240 and 236 of blower speed switch 212. Wire 86 connects terminals 220 and 222 of the system switch with terminal 132. Wire 88 connects terminal 228 of the blower speed switch with terminal 128. Wire 90 connects terminal 234 of the blower speed switch with terminal 238 of the blower speed switch and terminal 130.

OPERATION

During operation of the furnace 115 volt power is received by terminals 101 and 102 to operate the furnace. As can be seen in FIG. 1, when there is a demand for heat, heating blower relay 152 is not energized and heating blower contact 103 as well as cooling blower relay contacts 104 and 100 are closed and the blower motor will be operated at low speed thru terminal 107. In the cooling mode of operation, cooling blower relay contacts 104, 100, 99 and 105 will reverse positions and the blower motor will be operated through terminal 108 in the high speed mode of operation. In either mode of blower speed operation, electronic air purifier will be operated through terminals 98 and 111 connected by wires 20 and 10.

Power is supplied to the control circuit of the furnace by transformer 112. Typically 115 volt current enters the primary winding of the transformer through terminals 114 and 116 and 24 volt current is received at the secondary terminals 118 and 120. Upon startup, the control circuit current passes from the secondary terminals through the over-temperature limit switch 122 to terminal 124 and thru the room thermostat (not shown), to terminal 128 and to the time delay relay circuit 154. The time delay relay circuit is so arranged that when the furnace is initially connected the circuit will energize heating blower relay 152 to hold heating blower relay contacts 103 in the open position preventing the blower from operating. If the cooling mode of operation is desired the cooling blower relay 156 is energized through terminal 130 to close normally open blower relay contacts 99 and 105, and open normally closed contacts 100 and 104 to allow the blower motor to be operated through terminal 108.

When heating is desired the thermostat energizes terminal 126 through wires 80 and 82. Terminal 126 energizes terminal 144 of the gas regulator valve 150 which activates terminal 148. Terminal 148 through wire 36 engages a time delay relay circuit which delays blower operation for a predetermined time period of approximately 75 seconds while the furnace comes up to temperature. When the heating requirements of the enclosure have been satisfied the current from the thermostat is discontinued and time delay relay circuit 154 allows blower operation to continue for a predetermined time period of approximately 75 seconds thereafter to circulate the remaining heated air within the furnace. For a better and more thorough explanation of the operation and apparatus of the time delay relay circuit 154 see United States Patent Application entitled "A Furnace Having A Normally Closed Blower Relay", serial number 846,869, filed simultaneously herewith.

When cooling is desired the thermostat energizes terminal 132 if the system switch 210 is in the cooling mode of operation. Therein thermostat 208 will energize wire 78 which through system switch 210 will energize terminal 132 which is connected to the refrigeration unit (connection not shown).

Current is received by the combination thermostat and blower speed control from terminal 124 which is connected to terminal 118 of transformer 112. System switch 210 when in the cooling position connects contact 218 to contact 220 and contact 224 to contact 222 all of system switch 210. When heating is required, thermostat 208 energizes wire 80 connected to terminal 216 of system switch 210. If the system switch 210 is in the heating mode of operation terminal 216 will be connected to terminal 214 of the system switch and wire 82 will be energized, said wire energizing terminal 126 leading to the gas regulator valve 150. When the system switch 210 is in the off position neither terminal 126 for heating nor terminal 132 for cooling may be energized.

Blower speed switch 212 also receives power from wire 76 connected to terminal 124. When the blower speed switch 212 is in the automatic position terminal 230 is connected to terminal 228 and terminal 238 is connected to terminal 240 such that current is automatically provided through wire 88 to terminal 128 for heating blower operation. When in the automatic mode the time delay relay circuit 154 is energized opening the normally closed heating relay contacts 103 so that the blower does not operate. Of course when a heating requirement is sensed by the thermostat and when the system switch is in the heating position wire 126 will be energized to activate the time delay relay circuit such that the heating blower contact 103 may be closed after a predetermined time to operate the blower at low speed to meet the heating requirements. In the automatic position blower speed switch 212 also connects terminals 240 and 238 thereof such that should the system switch be in the cooling mode of operation current will be conducted thru terminal 224 of the system switch to terminal 240 of the blower speed switch. When the blower speed switch is in the automatic position the current then flows to terminal 238 which is connected to terminal 130 which operates the cooling blower relay. Consequently when the blower speed switch is in the automatic position and the thermostat senses a cooling need and the system switch 210 is in the cooling mode of operation the blower will be operated at high speed through terminal 130.

When the blower speed switch 212 is in the low speed position terminal 232 will be connected to terminal 230 of the blower speed switch thereby removing power from terminal 128 and heating relay 152 causing contact 103 to close and operate the blower motor at low speed thru cooling blower relay contacts 104 and 100. The other half of blower speed switch 212 when it is in the low speed position will connect terminal 236 to terminal 238 of said switch such that when the cooling need is sensed and the system switch is in the cooling mode of operation current will be supplied to terminal 130, actuating cooling blower relay 156 which operates the blower motor at high speed. When the blower speed switch is in the high speed position terminal 232 will be connected to terminal 234 which energizes wire 90 to terminal 130. Terminal 130 actuates the cooling blower relay which operates the blower motor at high speed.

SUMMARY

From the above description of the preferred embodiment of the invention it is apparent that a combination thermostat and blower motor speed control has been provided for use with an air conditioner system for both heating and cooling air which is circulated through an enclosure. The blower speed switch is so connected that blower operation may be selected at the thermostat either at low speed, high speed or automatic operation depending upon the mode of operation of the air conditioner. There has further been provided an override such that when the cooling need is sensed by the thermostat and when the system switch is in the cooling mode of operation the blower motor will be operated at the high cooling speed notwithstanding the selection of either automatic or low speed blower operation at the blower speed switch. Hence the occupant of the enclosure may select the quiet low speed continuous operation for circulating air within the enclosure without affecting the capability to operate the refrigeration unit to cool the enclosure which requires high speed blower operation.

Modifications of this combination thermostat and blower speed control may be made within scope of this invention for the use of this combination control with a furnace circuit having other than a normally closed blower relay contact.

The above described invention has been described with particular reference to a preferred embodiment thereof but it will be understood that variations and modifications can be effected within the spirit and scope of the invention.

We claim:

1. A combination thermostat and blower speed control for use with an air conditioner for both heating and cooling air which is circulated through an enclosure by a multi-speed blower, said blower having a predetermined speed for both heating and cooling, which comprises:
   temperature sensing means for determining if heating or cooling is required;
   a system switch connected to the temperature sensing means for determining whether to operate the air conditioner in the heating mode or the cooling mode; and
   a blower speed switch for operating the blower at preselected speeds independent of the heating or cooling mode, said blower speed switch being connected to the system switch such that when a need for cooling is determined and when the system switch is in the cooling mode of operation the blower will be operated at cooling speed notwithstanding the pre-selected blower speed.

2. The invention as set forth in claim 1 wherein the system switch has three positions which include:
   a heat position in which the air conditioner may be operated in the heating mode;
   an off position in which the air conditioner is not operated; and
   a cool position in which the air conditioner is operated in the cooling mode.

3. The invention as set forth in claim 2 wherein the blower speed switch has three positions which include:
   an automatic position in which the blower may be operated at cooling speed when cooling is required and at heating speed when heating is required;
   a low speed position in which the blower is operated at low speed except when cooling is required; and
   a high speed position in which the blower is operated at cooling speed.

4. The invention as set forth in claim 3 wherein the system switch is in the cooling mode of operation and a cooling need is sensed, current will flow through the system switch to the blower speed switch, the blower speed having contacts such that when it is in the automatic or low speed positions the blower will be operated at high speed.

5. A method in a combination thermostat and blower speed control of an air conditioner for both heating and cooling air which is to be circulated through an enclosure by a multispeed blower, having predetermined low speed for heating and a predetermined high speed for cooling, which comprises the steps of:

sensing the enclosure temperature to determine if heating or cooling is desired;

selecting whether the air conditioner is to be operated in a heating mode or a cooling mode by a system switch;

controlling blower speed operation by setting a blower speed switch; and overriding the blower speed switch to operate the blower at high speed when the cooling mode has been selected and when a cooling need has been sensed.

6. The invention as set forth in claim 5 wherein the step of overriding includes:

energizing an electrical connection from the system switch to the blower speed switch such that when a cooling need is sensed the blower is operated at high speed through the blower speed switch.

* * * * *